June 5, 1928.  1,672,470
B. A. PETERSON
WARPER
Filed April 16, 1924   8 Sheets-Sheet 4
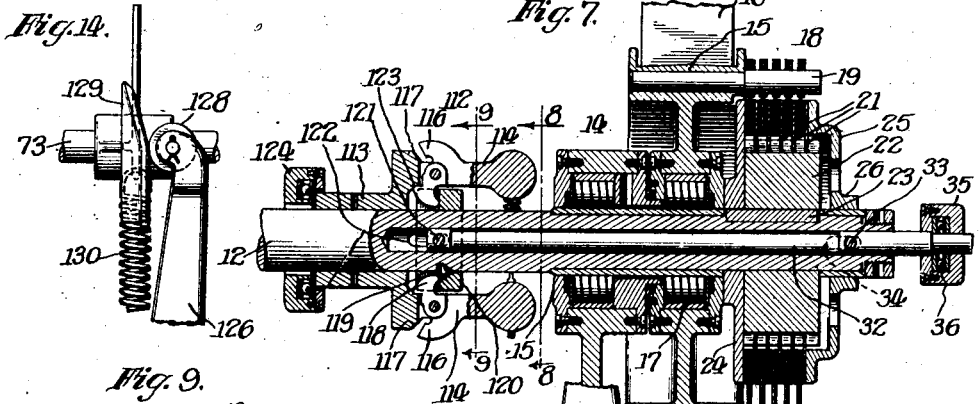
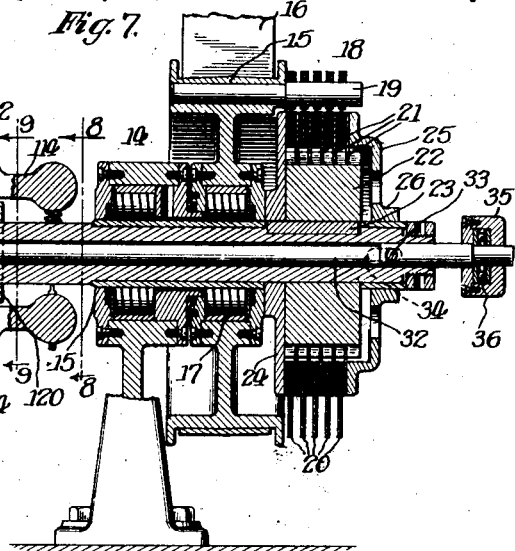
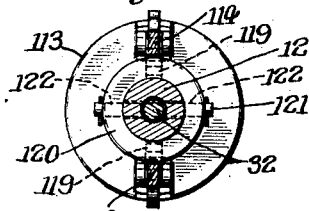
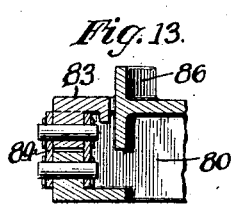
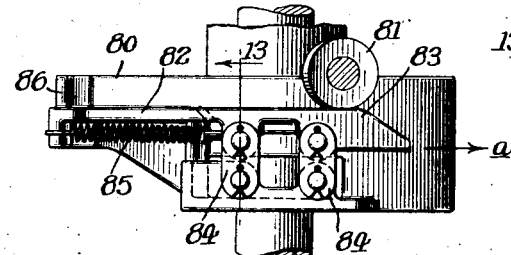
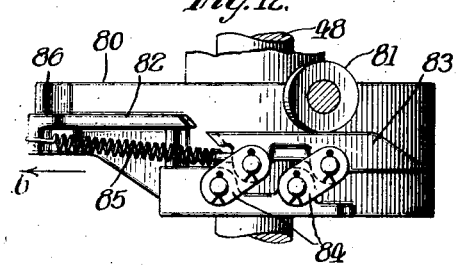
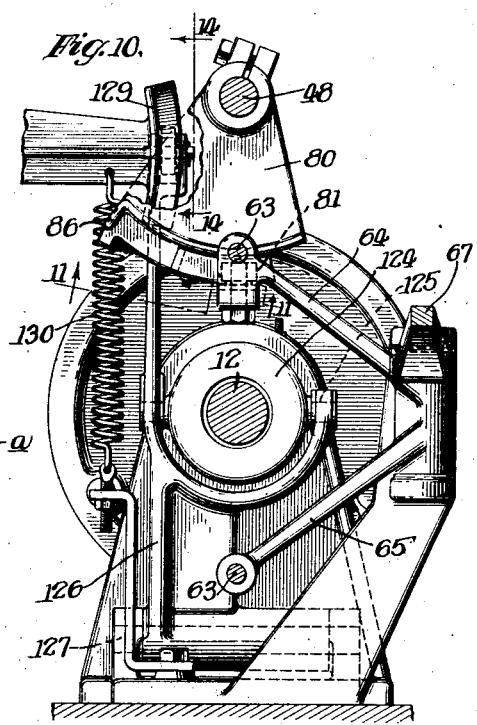
Inventor:
B. A. Peterson,
By Churchill Parker Jackson
Att'ys.

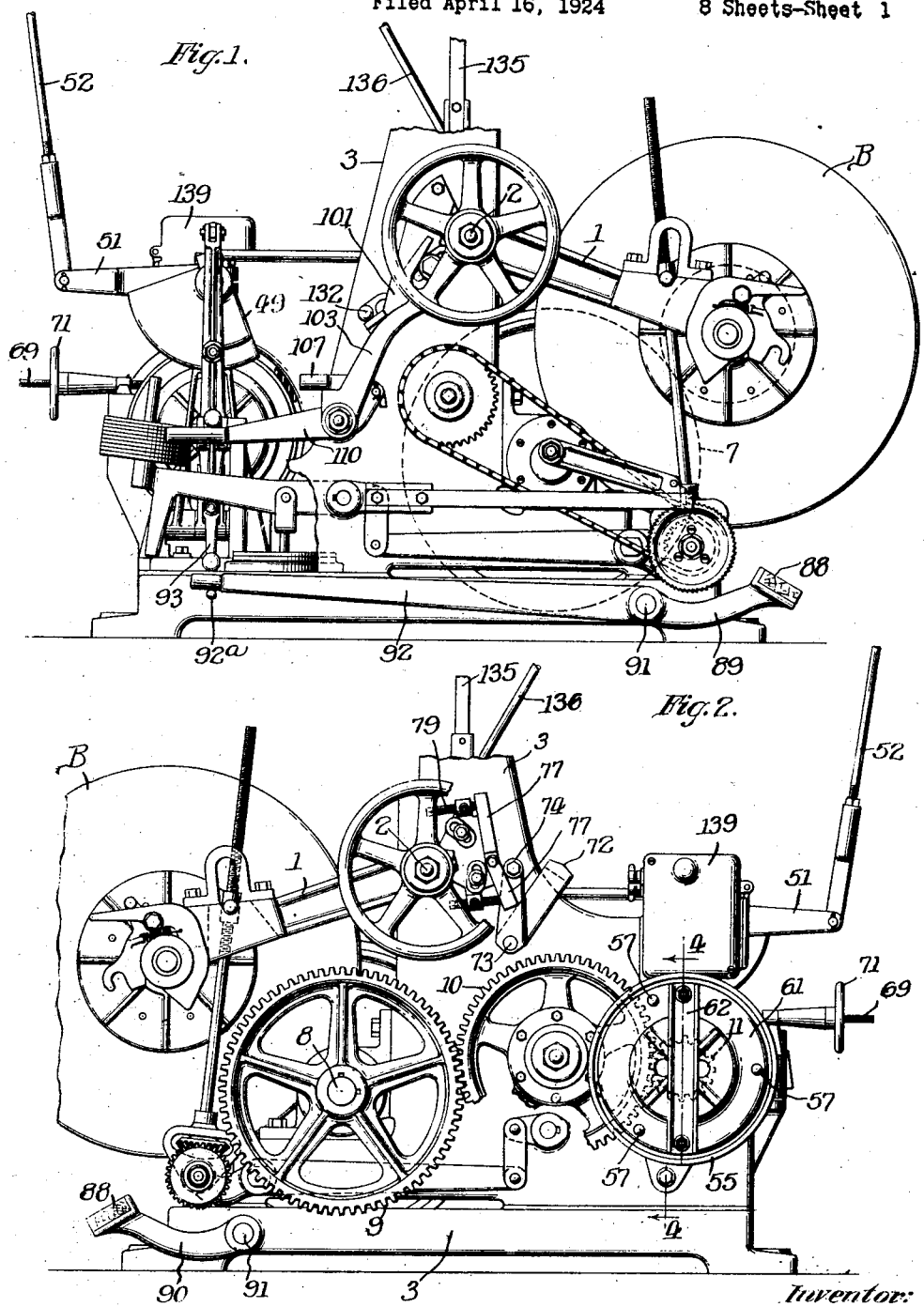

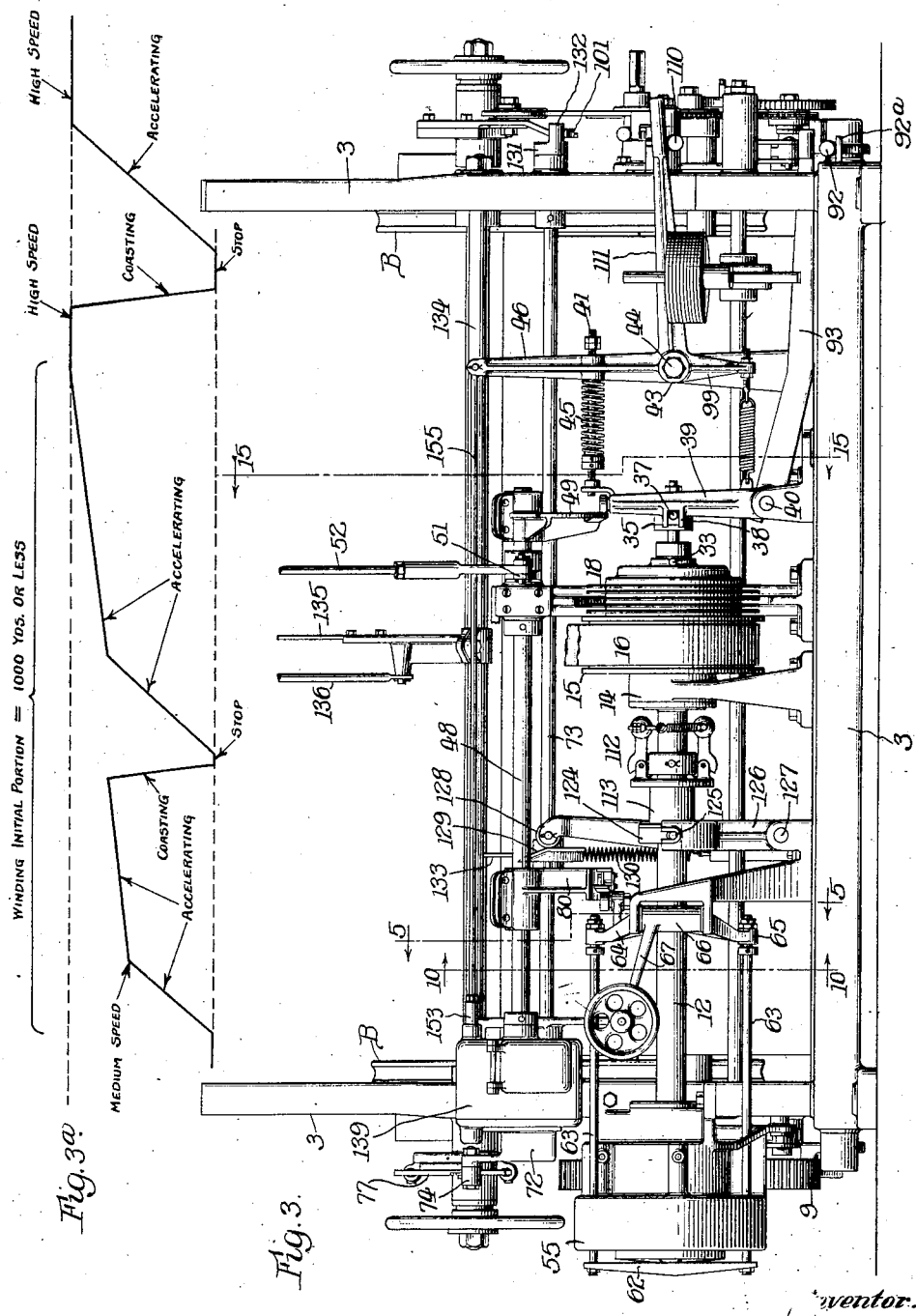

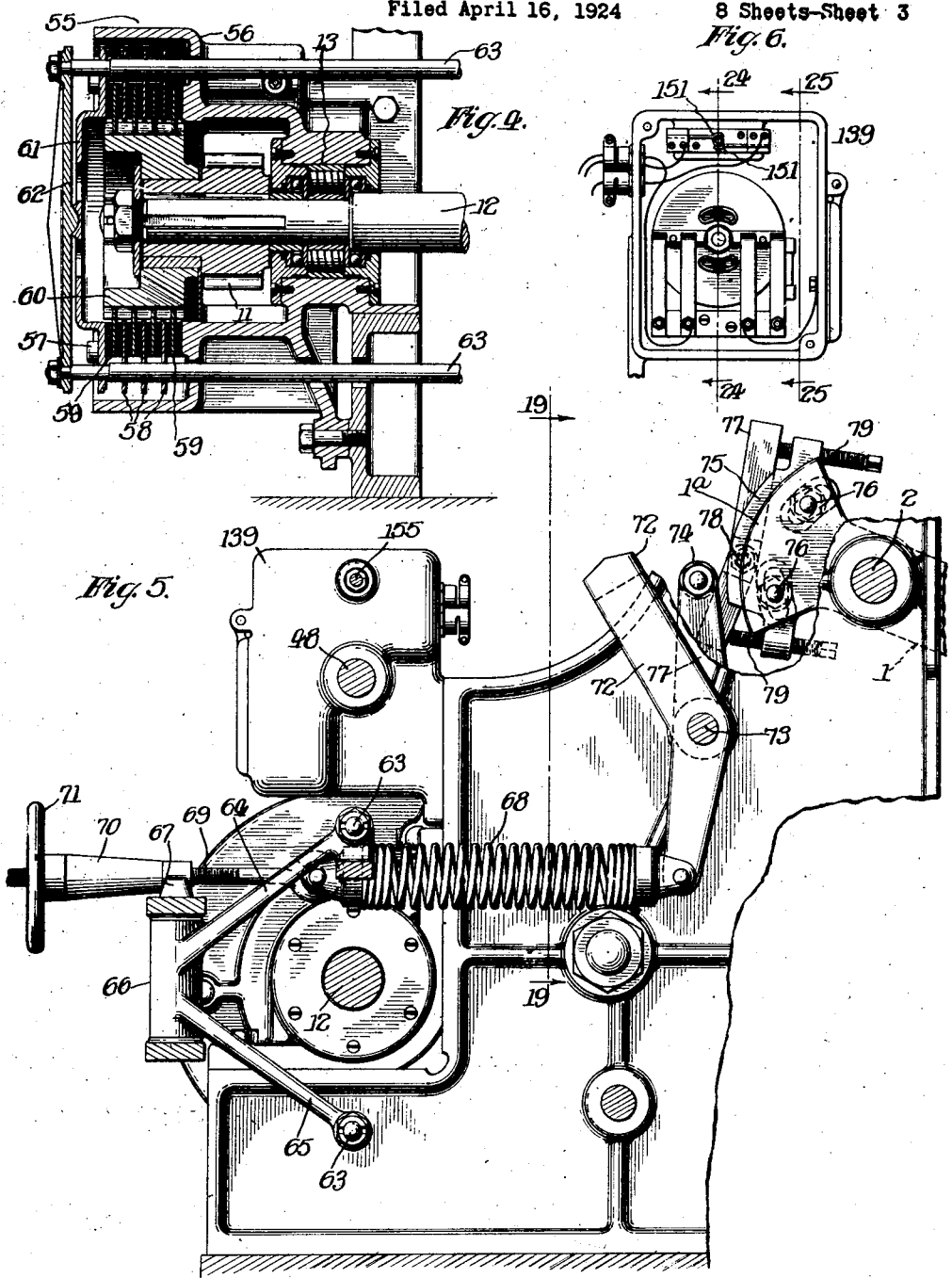

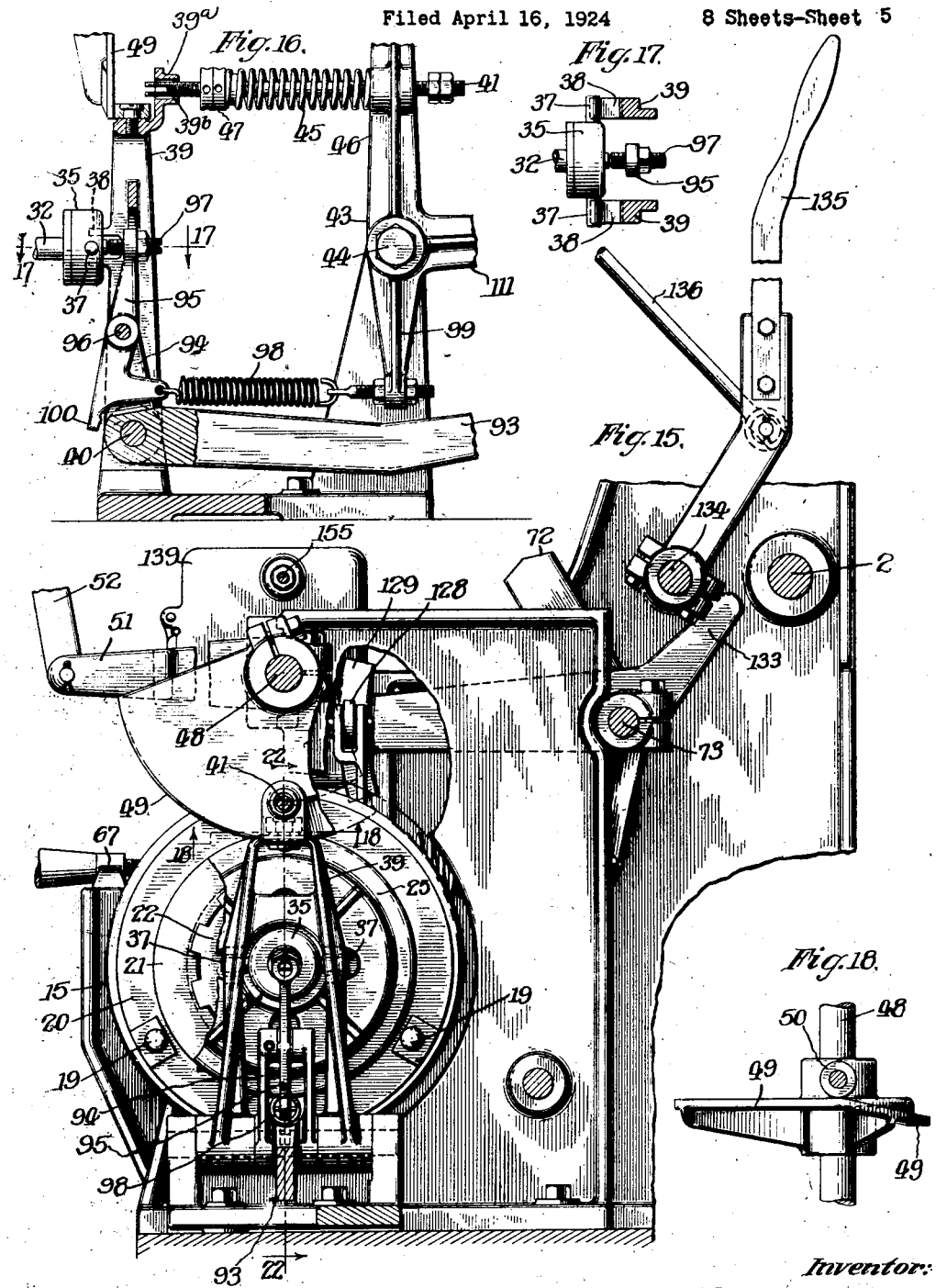

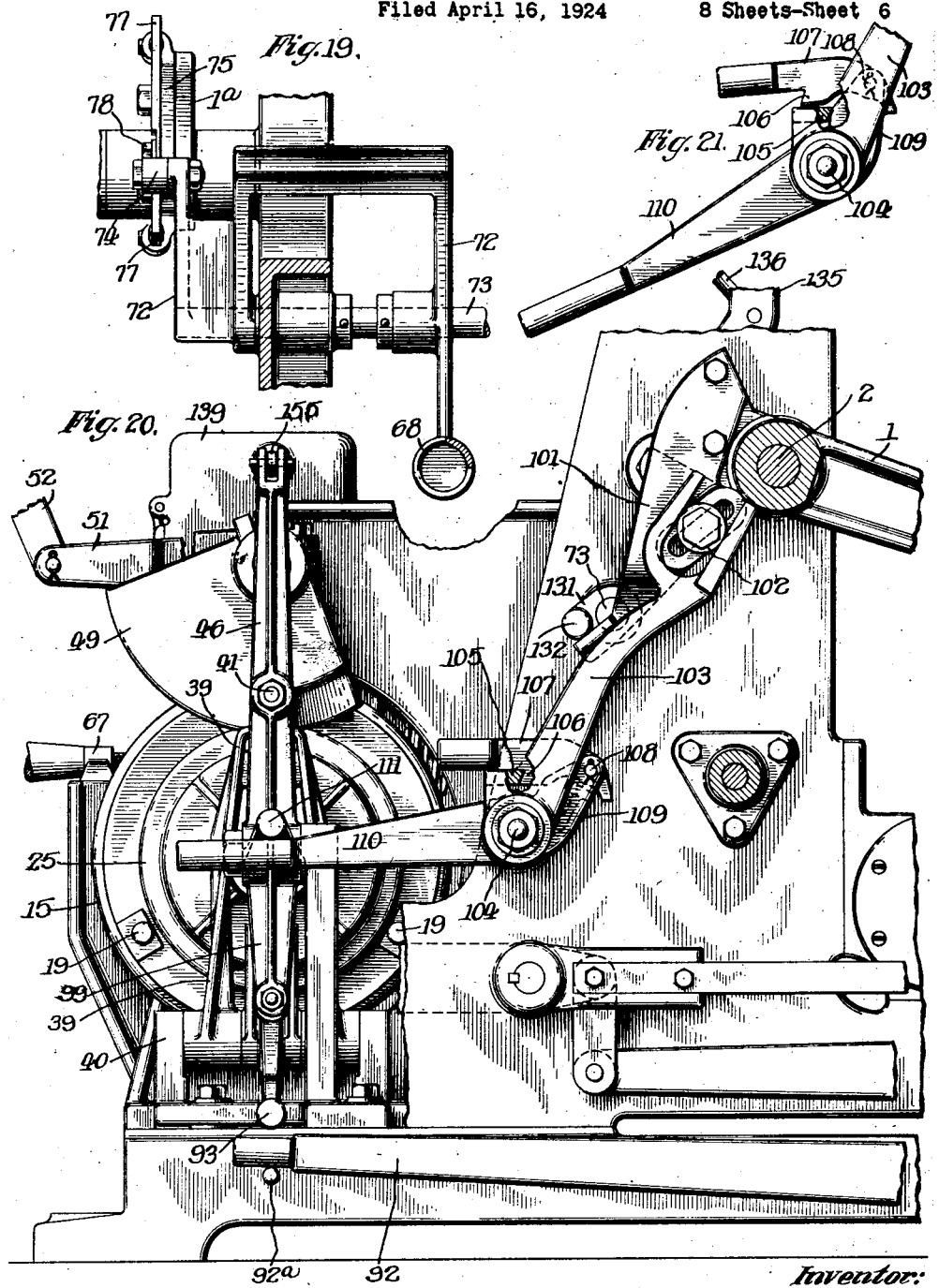

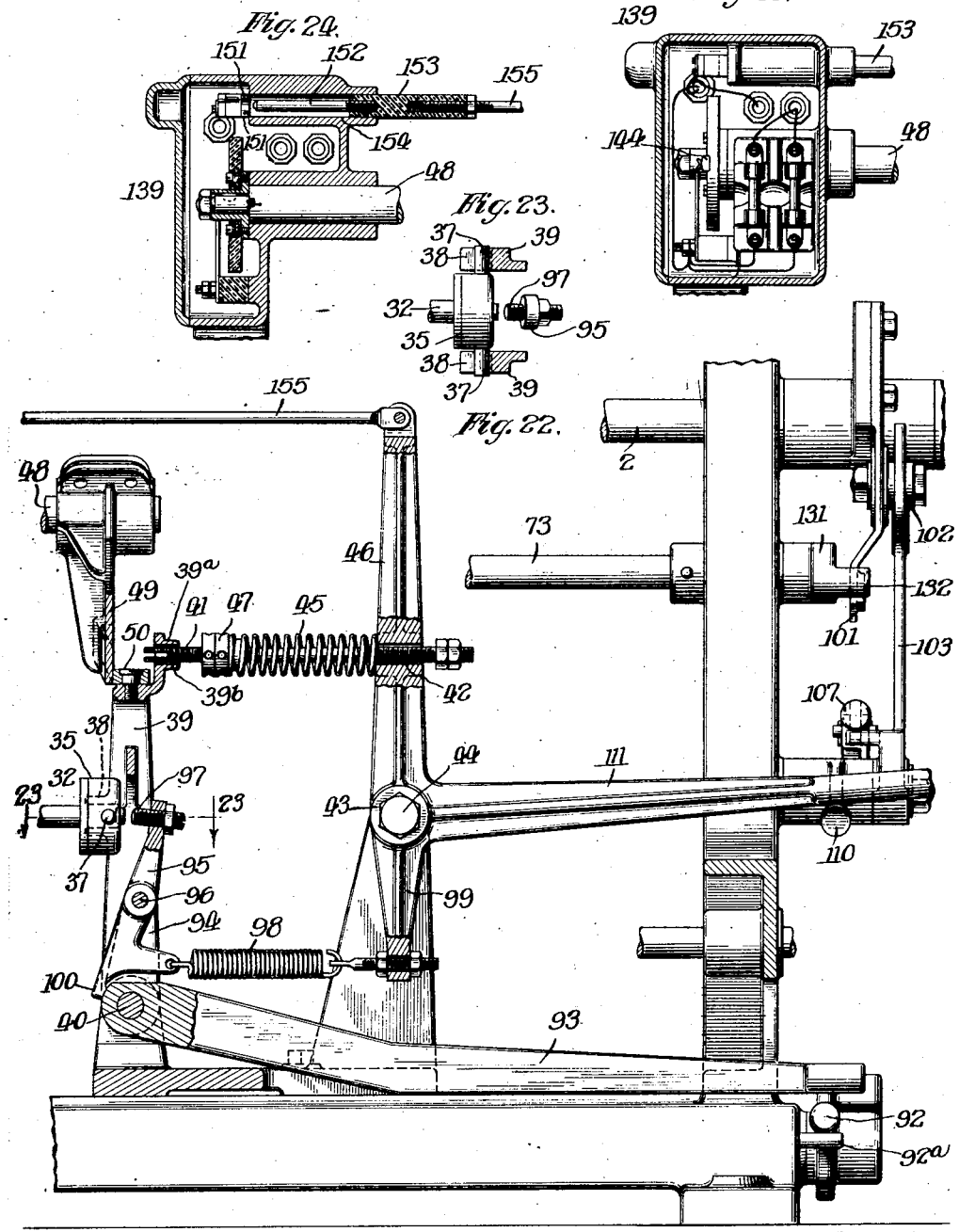

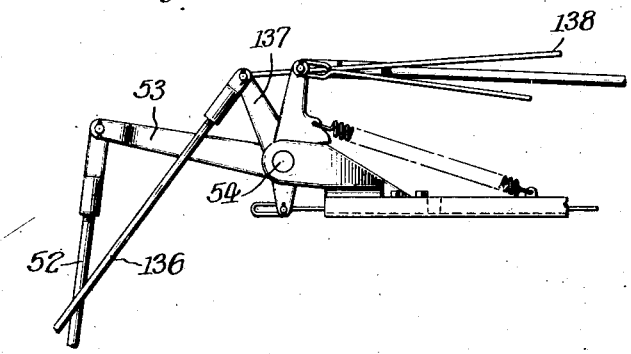
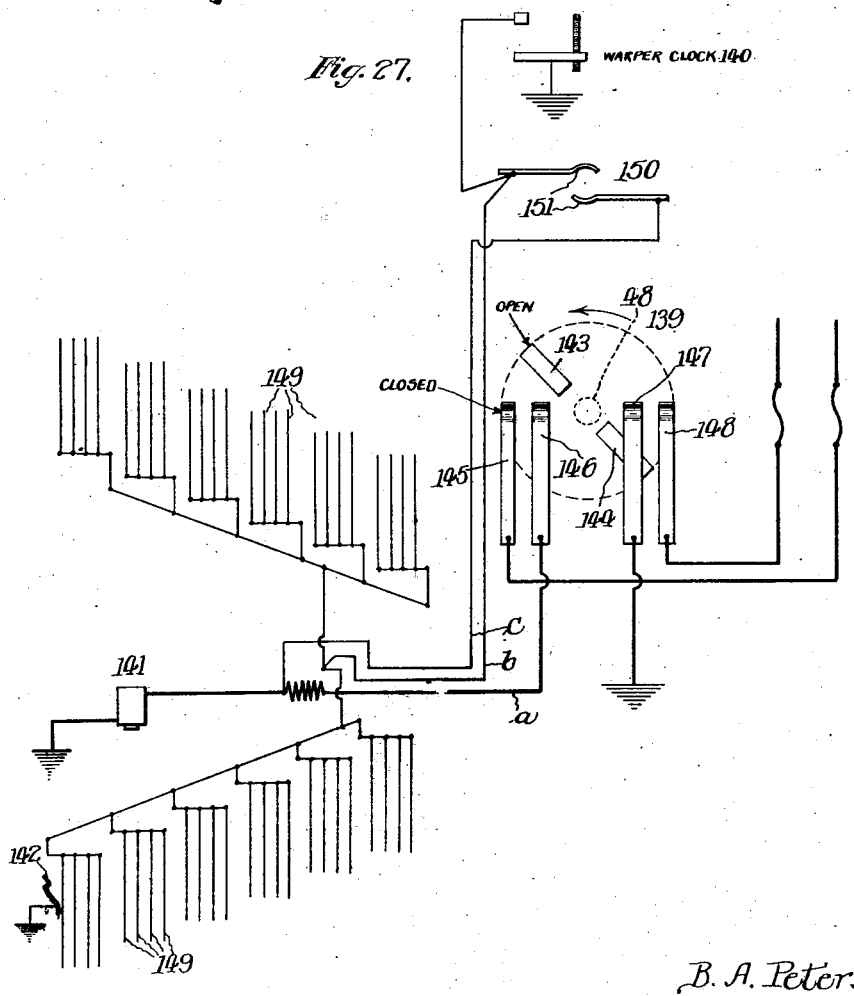

Patented June 5, 1928.

1,672,470

UNITED STATES PATENT OFFICE.

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS.

WARPER.

Application filed April 16, 1924. Serial No. 706,834.

The warper herein shown is an improvement upon the warper disclosed in application Serial No. 443,541, filed February 9, 1921 by Howard D. Colman.

One of the objects of the invention is to make the driving clutch and the braking clutch readily accessible for adjustment and repair.

Another object is to provide a very simple low-speed drive, and one which shall permit of variations in speed, thus enabling the warper tender when looking for a thread end to rotate a small beam slowly and a large beam more rapidly.

Another object is to provide a construction which shall permit very prompt application of the beam brake.

Various other improvements and advantages will become apparent as the description proceeds.

In the accompanying drawings, Figure 1 is a left-hand end view of a warper embodying the features of my invention, certain parts being broken away. Fig. 2 is a fragmental right-hand end view of the warper. The machine is shown at rest. Fig. 3 is a rear elevation, with the machine in the position shown in Figs. 1 and 2. Fig. 3ª is a diagram illustrating the gradual increase in speed during the winding of the first one thousand yards or so, and the character of the acceleration upon restarting after a stoppage. Fig. 4 is a vertical sectional view, illustrating the beam brake. Fig. 5 is a section on line 5—5 of Fig. 3. Fig. 6 is a view of two electric switches comprised in the apparatus. Fig. 7 is a sectional view illustrating the driving clutch and the governor that controls acceleration during the winding of the initial portion of the yarn mass. Fig. 8 is a section on line 8—8 of Fig. 7. Fig. 9 is a section on line 9—9 of Fig. 7. Fig. 10 is a section on line 10—10 of Fig. 3. Fig. 11 is an under side view taken in the plane of line 11—11 of Fig. 10, showing the position occupied when the beam brake is held disengaged. Fig. 12 is a view like Fig. 11, but showing the position assumed when the beam brake is applied. Fig. 13 is a section on line 13—13 of Fig. 11. Fig. 14 is a section on line 14—14 of Fig. 10. Fig. 15 is a section on line 15—15 of Fig. 3. Fig. 16 is a view showing the low-speed drive in use. Fig. 17 is a section on line 17—17 of Fig. 16. Fig. 18 is a section on line 18—18 of Fig. 15. Fig. 19 is a section on line 19—19 of Fig. 5. Fig. 20 is a fragmental left-hand end view of the warper. Fig. 21 illustrates a latch for disabling the driving clutch. Fig. 22 illustrates a portion of the low-speed drive and means for controlling the low-speed and high-speed drives the view being taken approximately in the plane of dotted line 22—22 of Fig. 15. Fig. 23 is a section on line 23—23 of Fig. 22. Figs. 24 and 25 are sectional views of the electric switches shown in Fig. 6. Fig. 26 illustrates a portion of the operating connections between the warper and the mechanism on the creel that operates the creel brakes, the beam brake and the driving clutch. Fig. 27 is a diagram of the electric circuits.

The embodiment herein shown of my invention is especially adapted for use with a creel of the general character disclosed in application Serial No. 190,501, filed September 10, 1917 by Howard D. Colman (Patent No. 1,544,055, dated June 30, 1925). It will be understood, however, that various features of the present invention are independent of the creel and independent of other features of the warper.

Referring now to Fig. 1, B designates a section beam, the trunnions of which are engaged by arms 1. These arms are pivotally mounted upon a shaft or rod 2 extending through the main frame 3 of the warper. The yarn wound around the beam B rests upon a friction driving drum 7. Said drum is fixed upon a shaft 8 (Fig. 2) which is journaled in the warper framework and carries at one end a spur gear wheel 9 that meshes with a similar gear wheel 10 rotatably supported on the frame. The gear wheel 10 in turn meshes with the pinion 11 fixed upon a drive shaft 12 (Figs. 3 and 4) which is supported in the rear portion of the framework in roller bearings 13 and 14 (Figs. 4 and 7).

To drive the shaft 12 I provide a pulley 15 (Fig. 7) continuously driven by a belt 16. The pulley 15 is rotatably supported on the shaft 12 intermediate the ends of the latter by means of a roller bearing 17. As shown in Fig. 3, the pulley 15 is approximately midway between the ends of the main frame 3, consequently the pulley and its drive belt are out of the way of the operator when she is connecting a new set of supply masses to the beam or performing other operations about the machine. Power is transmitted from the pulley 15 to the shaft 12 by a clutch 18 of the multiple-disk type. In the present construction the pulley 15 carries a suitable number of posts 19 upon which are slidably mounted disks or rings 20 which alternate with disks or rings 21 carried upon a body 22 which is connected to rotate with the shaft 12 by means of a spline 23. The disks 20 and 21 lie between a flange 24 splined on the shaft 12 and a flange or pressure plate 25 on a sleeve 26 which is slidable longitudinally upon the shaft 12. As shown in Figs. 3 and 7, the clutch 18 is located at the inner end of the drive shaft, where access may be readily had to the clutch for adjustment or repair.

The means for clamping the disks 20 and 21 together comprises a rod 32 extending axially of the shaft 12 and having near its outer end a transverse pin 33, the ends of which extend through slots 34 in the shaft 12 and lie in notches in the sleeve 26. On the outer end of the rod 32 is mounted a head 35 containing a thrust bearing 36 through which pressure upon the head 35 is transmitted to the rod 32 to cause inward longitudinal movement of the latter. The head 35 is provided with studs 37 (Fig. 22) which lie in forks 38 on a lever 39 (Fig. 23). The lever 39 is pivoted in the framework of the machine at 40 (Fig. 22). At the upper end of the arm 39 is a sleeve $39^a$ carrying a transverse pin $39^b$. A rod 41 extends into the sleeve $39^a$, said rod being slotted to fit over the pin $39^b$. It will be seen that the rod 41 may be readily disengaged from the arm 39 when access to the clutch plates is desired. The opposite end of the rod 41 extends freely through an opening 42 in a three-arm lever 43 which is pivoted in the framework at 44. A coiled expansive spring 45 surrounds the rod 41 and is interposed between the arm 46 of the lever 43 and an adjusting nut 47 on the rod 41. When the spring 45 is free to exert its force it swings the lever 39 in the direction to force the rod 32 inwardly and thus clamp the friction disks 21 and 22 together, whereby power is transmitted from the drum 15 to the shaft 12 to rotate the beam B.

To throw the high speed drive in and out of action there is provided a rock shaft 48 (Fig. 3) supported in the warper framework and having fixed thereto a segmental cam 49 against which bears a roller 50 on the upper end of the lever 39. The means for turning the shaft 48 comprises an arm 51 fixed to said shaft and operated by any suitable means as, for example, the means disclosed in said Colman Patent No. 1,544,055. (Reference may also be had to the Peterson & Cummings application Serial No. 683,563, filed December 31, 1923, Patent No. 1,575,933, dated March 9, 1926.) The means shown in said Colman patent includes a rod 52 connecting the arm 51 to a crank arm 53 (Fig. 26) which is pivoted upon a shaft 54. The arm 53 is connected to a suitable brake-applying and resetting mechanism. When said mechanism is actuated through the exhaustion or excessive slackening of a thread, the shaft 48 is turned in the direction to cause the cam 49 to relieve the clutch 18 of the pressure of the spring 45, as shown in Figs. 3, 15, 20 and 22.

To cause prompt stoppage of the beam upon exhaustion or excessive slackening of a thread, I provide a brake 55 (Fig. 3). The brake herein shown is of the disk clutch type and comprises a housing 56 (Fig. 4) secured to one end of the framework of the machine concentrically with the shaft 12 and carrying posts 57 (Figs. 2 and 4) on which are mounted disks 58. These disks alternate with disks 59 carried by a body 60 which is rigid with the outer end of the shaft 12. It will be seen that the braking clutch 55 is readily accessible for adjustment or repair. The disks 58 and 59 are arranged to be pressed together by means including a pressure plate 61 slidably mounted on the posts 57. The central portion of the pressure plate 61 is engaged by a cross head 62 which is connected to two rods 63. These rods are attached to two arms 64 and 65 (Fig. 3) which are rigidly connected together and are pivoted to swing on the axis 66. Rigid with the arms 64 and 65 is an arm 67 to which a coiled contractile spring 68 (Fig. 5) is adjustably connected. As herein shown, one end of said spring is attached to a screw-threaded rod 69 which extends loosely through an opening in the arm 67. On the outer portion of the rod 69 is a nut 70 having a hand wheel 71. By turning the hand wheel 71 the tension of the spring 68 may be adjusted. The other end of the spring 68 is pivotally connected to one arm of a lever 72 (Figs. 5 and 19) which is pivoted upon a shaft 73. The lever 72 carries a roller 74 which bears against a cam attached to the adjacent arm 1. While said cam may be of any suitable construction it is herein shown as adapted to permit of convenient change of form. As shown in Fig. 5, a plate 75 is secured to the rearward extension $1^a$ of the arm 1 by means of screws 76 which extend through elongated openings in said plate, whereby the plate is adjustable around the axis of the arm 1. Two bars 77 are pivoted end to end to the plate 75 at 78. The outer ends of the bars 77 rest upon adjusting screws 79 carried by the plate 75. It will be seen that the bars 77 provide a cam surface against which the roller 74 is held by the spring 68. The location of the cam 77 with reference to the arm 1 may be varied by adjusting the plate 75 on the axis of said arm, and the form of the cam may be changed by adjusting the screws 79.

Since the beam B is driven through peripheral contact of the yarn mass with the friction drum 7, its speed of rotation will decrease as the beam fills. The mass of the yarn load on the beam, of course, increases as the beam fills. The net result of the decreasing speed and the increasing mass will be an increase or a decrease in momentum dependent upon the amount and distribution of the mass in the beam, its yarn load and the rotating machine elements. In the construction herein illustrated the momentum of the beam may be considered to increase as the beam fills. On this assumption it is desirable to adjust the beam brake to make the same more powerful as the beam fills. This result is attained by means of the cam 77 and its connections to the spring 68. As the yarn mass on the beam grows, the beam and the arms 1 rise, the cam 77 operating to cause the lever 72 to swing in the direction to increase the tension of the spring 68, thereby causing a stronger application of the beam brake at each successive stoppage, the result of increasing the brake pressure being to keep the retardation or deceleration approximately the same at all times. However, it will be understood that if for any reason it is desirable to diminish the coasting of the beam at each stoppage the cam 77 may readily be adjusted to produce such result.

The means for applying and releasing the beam brake 55 consists of a segmental cam 80 (Fig. 10) fixed upon the rock shaft 48 and arranged to engage a roller 81 (Fig. 11) carried by the arm 64. For a purpose to appear hereinafter, that portion of the cam 80 which engages the roller 81 is arranged to yield when the cam swings in a certain direction. As shown in Figs. 11, 12 and 13, the cam 80 is provided with a peripheral flange 82 having a yieldable section 83. The section 83 is connected to the body of the cam 80 by means of parallel links 84. A contractile spring 85 holds the yieldable section 83 in line with the fixed section 82, as shown in Fig. 11, when the cam 80 is turning in the direction indicated by the arrow a and when the cam is at rest in brake-withholding position. When, however, the cam 80 turns in the direction indicated by the arrow b in Fig. 12, the flange section 83 yields against the tension of the spring 85 and thus releases the brake-applying spring 68 at an earlier point in the movement of the cam than would be the case if the flange 82 were incapable of yielding. In case the shaft 48 should be accidentally permitted to turn slightly beyond the normal clutching and brake-releasing position, further movement of the shaft is prevented by the contact of a safety stop 86 (Figs. 10 and 11) on the cam 80 with the roller 81.

After the detector mechanism has operated to stop the warper, it is desirable to be able to revolve the beam slowly while finding a thread end on the beam and preparatory to restarting the winding operation. In order that the beam may be rotated at low speed, there is provided the mechanism to be now described.

A treadle 88 (Fig. 1) extends across the front of the warper beneath the beam, said treadle being carried by arms 89 and 90 (Fig. 2) fixed upon a shaft 91. Integral with the arm 89 is a rearwardly extending arm 92, the weight of which normally holds the treadle 88 elevated as shown in Figs. 1 and 2. 92ᵃ is a stop pin against which the arm 92 normally rests. The rear end of the arm 92 underlies an arm 93 (Fig. 22) which is pivoted upon the axis 40. Rigid with the arm 93 is an upwardly extending arm 94 on which a lever 95 is pivoted at 96. The upper arm of the lever 95 carries a screw 97 located in position to be pressed against the end of the rod 32. The lower arm of the lever 95 is connected through a coiled contractile spring 98 to the arm 99 of the three-arm lever 43. 100 is a stop lug on the lower end of the lever 95 which is normally held against the hub of the arm 93 by the spring 98. It will be seen that when the operator depresses the treadle 88, the arm 93 will be lifted, thereby swinging the arm 94 in the direction to carry the screw 97 against the end of the rod 32, as shown in Fig. 16, whereby the rod 32 is pushed into position to press the disks 20 and 21 together with a force sufficient to cause slow rotation of the beam. When the operator has found the thread end, she removes her foot from the treadle, whereupon the weight of the arm 93 causes the screw 97 to be withdrawn from the rod 32. After having pieced up the thread, the operator may again depress the treadle to turn the beam at low speed until the slack in the pieced-up thread has been taken up and all of the threads are seen to be running properly.

Upon turning to the diagram that forms Fig. 3ᵃ of the drawings, it will be seen that means is provided whereby the drum 7 is rotated at less than maximum speed during the winding of the initial portion of the yarn mass on the beam. In the present embodiment of the invention, the reduction in speed is obtained by slippage of the clutch 18, such slippage being controlled by a centrifugal governor. The change from reduced speed to high (i. e., normal) speed is a gradual one and is controlled by devices sensitive to increase in the diameter of the yarn mass on the beam.

Referring now to Figs. 20 and 22: The left-hand arm 1 is provided with a rearward extension or arm 101 on which is adjustably mounted a roller 102 that lies within the forked end of an arm 103 pivoted on the framework of the machine at 104. On the arm 103 is a lug 105 adapted to engage a shoulder 106 on a latch 107. The latch 107 is pivoted at 108 to an arm 109 of a lever 110, said lever being pivoted upon the axis 104. The rear end of the lever 110 underlies an arm 111 of the three-arm lever 43. It will be seen that as the yarn mass on the beam increases in diameter, the arms 1 will swing upwardly, thus causing the lever 110 to rise and swing the three-arm lever 43 in the direction to press the lever 39 toward the clutch 18, whereby pressure is transmitted through the rod 32 to increase the pressure between the disks 20 and 21. The amount of slippage between said disks is thus gradually reduced with a consequent gradual increase in the speed of the drum 7 and the warp beam.

In order that the speed of the drum 7 shall not become so great as to cause excessive slippage between the beam and the drum 7 in case the brake 55 be applied, I provide a centrifugal governor 112 which acts to control the acceleration of the beam during the winding of the initial portion of the yarn mass on the beam. Upon reference to Fig. 7, it will be noted that the governor comprises a sleeve 113 slidably mounted on the shaft 12. To one end of the sleeve 113 are pivoted two weighted arms 114 which are connected together by coiled contractile springs 115 (Fig. 8). Outward swinging movement of the arms 114 is limited through contact of the lugs 116 with the surfaces 117 on the sleeve 113. Rigidly connected with the arms 114 are inwardly extending arms 118 which lie within recesses 119 in a collar 120. The collar 120 is connected to the rod 32 by means of a pin 121 extending through elongated openings 122 in the shaft 12. Approaching movement of the weighted arms 114 is limited by engagement of shoulders 123 on the arms 118 with stop portions on the sleeve 113. On one end of the sleeve 113 is a thrust bearing 124 having diametrically opposite studs 125 (Figs. 3 and 10) which lie within notches in a forked lever 126 pivoted in the framework of the machine at 127. The upper end of the lever 126 carries a roller 128 (Fig. 14) arranged to lie in contact with a cam 129 fixed on the shaft 73. A coiled contractile spring 130 (Fig. 10) tends to swing the cam 129 downwardly out of engagement with the roller 128. On one end of the shaft 73 is fixed a crank arm 131 (Figs 20 and 22) having a stud 132 arranged to bear against the lower end of the arm 101.

When a new beam is being started, the arm 101 is in its highest position (as shown in Figs. 3 and 20), the cam 129 consequently being held with its high point in engagement with the roller 128. The position of the thrust bearing 124 determined by the engagement of the roller 128 with the high portion of the cam 129 is such as will enable the governor acting through the collar 120 and the rod 32 to produce sufficient slippage of the clutch 18 so that the speed shall not be great enough to cause excessive slippage between the drum and the beam in the event of application of the brake 55. The governor tends to keep the speed uniform by shifting the collar 120. As the yarn mass on the beam increases in diameter, the arm 101 swings downwardly and thus permits the spring 130 to draw the cam 129 downwardly, thereby allowing the spring 45 to place more pressure on the clutch and thus increasing the winding speed. When the cam 129 leaves the roller 128 (which occurs when the necessity for winding at reduced speed has passed), the centrifugal governor is ineffective to control the spring 45, since there is nothing to resist movement of the sleeve 113 to the left (Fig. 7) as the governor balls fly out. The extent to which the spring 130 can pull the cam 129 down is limited by contact of a stop arm 133 (Fig. 15) rigid with said cam with a rod 134. The arm 101 not only increases the compression of the spring 45, but also serves to increase the tension of the low-speed drive spring 98.

To start the warper at the intermediate or higher speed, the operator draws forward a hand lever 135 (Figs. 3 and 15) which is fulcrumed on the rod 134 midway of the length of the warper, said lever extending upwardly through the space between the two sets of threads coming from the opposite sides of the creel. To said lever is pivoted the lower end of a link 136, the upper end of which is connected to one arm of a bell crank 137 (Fig. 26) loosely mounted on the shaft 54. The bell crank 137 is connected to a rod 138 that extends to the resetting mechanism hereinbefore referred to. When the starting lever 135 is drawn forward, the re-setting mechanism causes the arm 51 to be raised, thereby turning the segment cams 49 and 80 and effecting the release of the brake 55 and the throwing in of the clutch 18.

A switch 139 (Figs. 6 and 27) controls the circuits of the warper clock 140, the trip coil 141, and the detectors 142 on the creel. The movable contact members 143 and 144 of said switch are attached to but insulated from the rock shaft 48 (see Figs. 24 and 25) and are arranged to bridge contact fingers 145, 146 and 147, 148 included in the circuits as shown in Fig. 27. When the warper is being stopped, the turning of the shaft 48 into the position shown in Fig. 27 opens the switch 139, thus interrupting the flow of current to ground through the fallen detector 142 or the clock 140, as the case may be, and the trip coil 141. When the warper is restarted at winding speed, the turning of the shaft 48 closes the switch 139, the detector circuits having, of course, been previously opened by the raising of the detectors by slow rotation of the beam, and the clock having been adjusted to initial position if the stoppage was due to completion of the beam.

It may be here stated that the warper and the creel are both grounded and are electrically connected together through the steel operating links 52 and 136. The drop wires or detectors 142 on the creel are grounded, and when released by slack or broken threads, they make contact with contact rods 149.

Referring now to Figs. 24, 25 and 27: 150 is a switch herein shown as consisting of two contact springs 151 and a contact pin 152 (Fig. 24) arranged to slide into and out of position between the springs 151. The contact pin 152 is secured to an insulating member 153 which is slidably mounted in an opening 154 in the casing that encloses the switches 139 and 150. The member 153 is connected to the arm 46 by means of a rod 155. The contact pin 152 is of such length that the switch 150 is closed at all times when the low-speed drive or the high-speed drive is in operative condition.

Assuming that an empty beam has been placed in the warper, and the threads connected to the beam, and that the parts are in the position shown in Figs. 3 and 22, the operation is as follows: The operator runs the warper slowly by depressing the treadle 88 until all the threads are seen to be running properly. The operator then throws out the low-speed drive by removing her foot from the treadle, and then pulls the hand lever 125. The re-setting mechanism on the creel thereupon removes the drag pressure and turns the shaft 48 into such position that the cam 49 allows the spring 45 to throw in the driving clutch 18. Said clutch then commences to accelerate the beam, the acceleration being controlled by the governor 112 so as to prevent the attainment of a speed so high that excessive slippage would occur between the yarn mass and the drum in case of stoppage, and the governor being adjusted as the beam fills so as to permit maximum speed to be reached when the yarn mass on the beam has attained sufficient size, say, one thousand yards or less. The action of the governor 112 and the cam 129 is illustrated in the diagram entitled Fig. 3ᵃ.

If a thread exhausts or becomes excessively slack, the detector 142 (Fig. 27) for such thread closes a circuit to ground which causes the trip coil 141 to be partially de-energized, whereupon a detent which normally holds the brake mechanism of the creel and the warper inoperative is released, as explained in said Peterson and Cummings application Serial No. 683,536. The cheese brakes are thereby applied and the shaft 48 turned in the direction to throw out the driving clutch 18 and throw in the braking clutch 55. The resetting mechanism on the creel then turns the shaft 48 in the opposite direction far enough to release the beam brake 55 and place a drag pressure on the cheeses in the creel, but not far enough to throw in the driving clutch 18. (This position is shown in Figs. 1, 2, 3, 15, 20 and 22.) The operator then finds the thread-end on the beam and pieces up the broken thread. To facilitate the finding of the end on the beam, the operator may set the beam in slow rotation by depressing the treadle 88. After having pieced up the thread the operator may again depress the treadle to turn the beam at low speed until the slack in the pieced-up thread has been taken up and all the threads are running properly. The apparatus is now ready to be operated at high speed. To remove the drag pressure from the cheeses and to throw in the high speed drive, the operator draws forward the hand lever 135. The resetting mechanism on the creel thereupon removes the drag pressure from the cheeses and turns the shaft 48 into such position that the cam 49 allows the spring 45 to throw in the driving clutch 18.

The warper may be stopped at any time by drawing forward the hand lever 135, as will be understood by reference to the Peterson and Cummings application Ser. No. 683,563 (Patent No. 1,575,933) and may be restarted by again operating said lever.

As the beam fills, the brake-actuating spring 68 is adjusted by the cam 77 so as to cause a stronger application of the beam brake at each successive stoppage.

When the beam has been filled, the warper clock 140 closes a circuit that causes the trip coil 141 to be partially de-energized, whereupon the cheese brakes are applied and the shaft 48 turned to apply the beam brake 55 and throw out the driving clutch 18, after which the beam brake 55 is released and the drag pressure substituted for the brake pressure on the cheeses. The beam may then be disconnected from the cheeses in any suitable way. If desirable, the cheeses may be held against rotation during the operation of disconnecting the beam from the cheeses by adopting the following procedure:

The warper having come to a stop as the result of completion of the yarn mass on the beam, the operator disengages the latch 107 (Fig. 20) from the shoulder 105 (as shown in Fig. 21) whereupon the arm 110 drops, and the arm 46 (Fig. 22) which serves as an abutment for the clutch-actuating spring 45 is thus left without the support necessary to render said spring effective, whereby the driving clutch is disabled. The disengagement of the latch 107 also opens the switch 150 which interrupts the supply of current to the conductors 149 and thus renders the detectors ineffective. The operator then pulls the hand lever 135, whereupon the resetting mechanism on the creel removes the drag pressure from the cheeses, the closing of the switch 139 incident to the turning of the shaft 48 causing the coil 141 to be energized to hold the resetting mechanism in the running position. The operator again operates the hand lever 135 as though to stop the warper, thereby causing the cheese brakes and the beam brake to be applied; and before the resetting mechanism on the creel can operate to release said brakes, said resetting mechanism is rendered ineffective by manual means not herein disclosed. The cheese brakes and the beam brakes are thus left in the applied position. The threads joining the cheeses and the beam having been severed. the beam is removed and replaced with an empty beam.

When removing the tridents from the creel and substituting tridents carrying full cheeses it is desirable that the cheese brakes be in the fully-withdrawn position so that they shall not touch the cheeses. Therefore before changing tridents, the operator draws forward the hand lever 135, whereupon the resetting mechanism releases the beam brake and places the creel brakes in drag position; and then again operates the hand lever 135 to cause the creel brakes to be fully withdrawn.

After the creel has been replenished with full cheeses, and before the operator begins to pick up the thread ends, she lifts the arm 110 until the latch 107 engages the shoulder 105, thus rendering the clutch 18 effective and closing the switch 150. Inasmuch as the detectors are all down at that time, the closing of the switch 150 causes the coil 141 to be partially de-energized, whereupon the beam brake and the cheese brakes are applied, the beam brake released and the cheese brakes placed in drag position. The operator then draws the threads from the full cheeses over to the warper and connects them to the new beam. The apparatus is then ready to be started in the manner stated in the opening portion of the description of operation.

I claim as my invention:

1. A warper having, in combination, a beam-driving clutch, a lever for throwing in said clutch, a three-arm lever, a compression spring interposed between the first mentioned lever and one arm of the other lever, said spring urging the first mentioned lever in the direction to throw in the clutch, a device to move the first mentioned lever to throw out the clutch, a treadle, an arm pivoted on the axis of the first mentioned lever and arranged to be moved by said treadle, a second arm rigid with the first arm, a lever on the second arm, one arm of the last mentioned lever being arranged to throw in the clutch, a tension spring connecting the other arm of the last mentioned lever to the second arm of the three-arm lever, and means responsive to growth of the yarn mass on the beam and acting on the third arm of the three-arm lever for increasing the compression of the first spring and increasing the tension of the second spring.

2. A warper having, in combination, a beam-driving clutch, a lever for throwing in said clutch, a three-arm lever, a spring interposed between the first mentioned lever and one arm of the other lever, said spring urging the first mentioned lever in the direction to throw in the clutch, a device to move the first mentioned lever to throw out the clutch, a treadle, an arm pivoted on the axis of the first mentioned lever and arranged to be moved by said treadle, a second arm rigid with the first arm, a lever on the second arm, one arm of the last mentioned lever being arranged to throw in the clutch, a spring between the other arm of the last mentioned lever and the second arm of the three-arm lever, and means responsive to growth of the yarn mass on the beam and acting on the third arm of the three-arm lever for adjusting said spring.

3. A warper having, in combination, a beam-driving clutch, a lever to throw in said clutch, a three-arm lever, a spring interposed between the first mentioned lever and one arm of the other lever, said spring urging the first mentioned lever in the direction to throw in the clutch, a device to move the first mentioned lever to throw out the clutch, a treadle, a lever arranged to be moved by said treadle, one arm of the last mentioned lever being arranged to throw in the clutch, a spring between the other arm of the last mentioned lever and the second arm of the three-arm lever, and means responsive to growth of the yarn mass on the beam and acting on the third arm of the three-arm lever for adjusting said springs.

4. A warper having, in combination, a beam-driving clutch, a lever for throwing in said clutch, a spring to urge the lever in the direction to throw in the clutch, a device to move said lever to throw out the clutch, a treadle, an arm pivoted on the axis of said lever and arranged to be moved by said treadle, a second arm rigid with the first arm, a lever on the second arm, one arm of said last mentioned lever being arranged to throw in the clutch, a spring connected to the other arm of the last mentioned lever and acting to urge said lever to throw in the clutch when the treadle is depressed, and means responsive to growth of the yarn mass on the beam for adjusting said springs.

5. A warper having, in combination, a beam-driving clutch, a lever to throw in said clutch, a spring to urge the lever in the direction to throw in the clutch, a device to move said lever to throw out the clutch, a treadle, an arm pivoted on the axis of said lever and arranged to be moved by said treadle, a second arm rigid with the first arm, a lever on the second arm, one arm of said last mentioned lever being arranged to throw in the clutch, a spring connected to the other arm of the last mentioned lever and acting to urge said lever to throw in the clutch when the treadle is depressed, and means responsive to growth of the yarn mass on the beam for adjusting the first mentioned spring.

6. A warper having, in combination, a beam-driving clutch, a lever to throw in said clutch, a spring to urge the lever in the direction to throw in the clutch, a device to move said lever to throw out the clutch, a treadle, an arm pivoted on the axis of said lever and arranged to be moved by said treadle, a second arm rigid with the first arm, a lever on the second arm, one arm of said last mentioned lever being arranged to throw in the clutch, and a spring connected to the other arm of the last mentioned lever and acting to urge said lever to throw in the clutch when the treadle is depressed.

7. A warper having, in combination, a beam-driving clutch, a lever to throw in the clutch, a lever having two arms, a spring interposed between the first mentioned lever and one arm of the other lever, said spring urging the first mentioned lever in the direction to throw in the clutch, a device to move the first mentioned lever to throw out the clutch, a treadle, a lever arranged to be moved by the treadle, one arm of the last mentioned lever being arranged to throw in the clutch, a spring between the other arm of the second-mentioned lever, a means responsive to growth of the yarn mass on the beam for turning the second-mentioned lever to adjust said springs.

8. A warper having, in combination, a beam-driving clutch, a lever to throw in the clutch, a lever having two arms, a spring interposed between the first mentioned lever and one arm of the other lever, said spring urging the first mentioned lever in the direction to throw in the clutch, a device to move the first mentioned lever to throw out the clutch, a treadle, a lever arranged to be moved by the treadle, one arm of the last mentioned lever being arranged to throw in the clutch, a spring between the other arm of the last mentioned lever and the other arm of the second-mentioned lever.

9. A warper having, in combination, a supporting framework, means including a friction drum mounted in said framework for supporting a warp beam, a drive shaft located in the rear part of the framework, a driving pulley mounted on said shaft approximately midway between the sides of the framework, a friction clutch on the inner end of said shaft for connecting said pulley to the shaft, a brake at the outer end of said shaft, means responsive to increase in the yarn mass on the beam for reducing slippage in the clutch and a governor for controlling the acceleration of the beam, said governor being mounted on said shaft between the drive pulley and the brake.

10. A warper having, in combination, a supporting framework, means including a friction drum mounted in said framework for supporting a warp beam, a drive shaft located in the rear part of the framework, a driving pulley mounted on said shaft approximately midway between the sides of the framework, a friction clutch on the inner end of said shaft for connecting said pulley to the shaft, and a friction clutch at the outer end of said shaft outside of said framework and comprising a clutch element connected to the shaft and a co-acting clutch element secured to the framework.

11. A warper having, in combination, a supporting framework, means including a friction drum mounted in said framework for supporting a warp beam, a drive shaft located in the rear part of the framework, a driving pulley mounted on said shaft approximately midway between the sides of the framework, a friction clutch on the inner end of said shaft for connecting said pulley to the shaft, and a brake at the outer end of said shaft outside of said framework.

12. A warper having, in combination, beam-supporting arms, one of which has a rearward extension, an arm arranged to be moved by said extension, a second arm pivoted on the axis of the first arm and carrying a latch arranged to engage the first arm, a driving clutch, a spring to actuate said clutch, and means operated by the second arm for increasing the effectiveness of the spring as the yarn mass on the beam grows.

13. A warper having, in combination, beam-supporting arms, one of which has a rearward extension, an arm arranged to be moved by said extension, a second arm pivoted on the axis of the first arm and detachably connected to the first arm, a driving clutch, a spring to actuate said clutch, and means operated by the second arm for increasing the effectiveness of the spring as the yarn mass on the beam grows.

14. A warper having, in combination, beam-supporting arms, one of which has a rearward extension, a driving clutch, a spring to actuate said clutch, and means operated by said extension for increasing the effectiveness of the spring as the yarn mass on the beam grows.

15. A warper having, in combination, beam-supporting arms, one of which has a rearward extension, a driving clutch, a spring to actuate said clutch, and means operated by said extension for increasing the effectiveness of the spring as the yarn mass on the beam grows, said means including a disengageable connection for use in disabling the clutch.

16. A warper having, in combination, a friction drum for supporting and rotating a warp beam, a brake for stopping rotation of the beam, said brake including an actuating spring, and means responsive to increase of the yarn mass on the beam for adjusting said spring, said means including a cam comprising a part arranged to swing as the yarn mass grows, two bars pivoted end to end to said part, and adjusting screws supporting the outer ends of said bars, and a member connected to said spring and engaging said bars.

17. A high speed warper having, in combination, a friction drum to support and rotate a warp beam, a brake to stop the rotation of the drum, and a cam for operating the brake, said cam comprising a body having a peripheral flange, a relatively movable flange section, parallel links connecting said flange section to the body of the cam, and a spring tending to hold the yieldable flange section in line with the remainder of the flange, said flange section yielding against the action of said spring when the cam is moved in the direction to apply the brake.

18. A high speed warper having, in combination, a friction drum to support and rotate a warp beam, a brake to stop the rotation of the drum, and a cam for operating the brake, said cam comprising a section arranged to yield when the cam moves in the direction to apply the brake.

19. A high speed warper having, in combination, a friction drum to support and rotate a warp beam, a brake to stop the rotation of the drum and a reciprocatory cam for operating the brake, said cam being adapted and arranged to apply and release the brake at different points in its reciprocation.

20. A winder having, in combination, means to support and rotate a yarn mass, a brake to stop the rotation of the yarn mass, and a reciprocatory cam for operating the brake, said cam being adapted and arranged to apply and release the brake at different points in its reciprocation.

21. A warping apparatus having, in combination, a clutch to drive the warp beam, a spring to actuate said clutch, means for increasing the effectiveness of the spring as the yarn mass on the beam grows, an electric circuit including a detector and means to throw out the clutch upon dropping of the detector, a switch in said circuit for disabling the detector, and manually operable means to disable the spring, said last mentioned means being arranged to open said switch.

22. A warping apparatus having, in combination, a clutch to drive the warp beam, means for increasing the effectiveness of the clutch as the yarn mass on the beam grows, an electric circuit including a detector and means to throw out the clutch upon dropping of the detector, a switch in said circuit for disabling the detector, and manually operable means to disable the clutch, said last mentioned means being arranged to open said switch.

23. A warping apparatus having, in combination, a clutch to drive the warp beam, a spring to actuate said clutch, mechanism for increasing the effectiveness of the spring as the yarn mass on the beam grows, said mechanism including a releasable connection, an electric circuit including a detector and means to throw out the clutch upon dropping of the detector, and a switch in said circuit for disabling the detector, said switch being connected for operation by said mechanism.

24. A warping apparatus having, in combination, a clutch to drive the warp beam, a spring to actuate said clutch, an electric circuit including a detector and means to throw out the clutch upon dropping of the detector, a switch in said circuit for disabling the detector, and manually operable means to disable the spring, said last mentioned means being arranged to open said switch.

25. A warping apparatus having, in combination, a clutch to drive the warp beam, an electric circuit including a detector and means to throw out the clutch upon dropping of the detector, a switch in said circuit for disabling the detector, and means to disable the clutch, said last mentioned means being arranged to open said switch.

26. A warper having, in combination, a beam-driving clutch, means to operate the clutch to drive the beam at high speed, a treadle, an arm arranged to be moved by said treadle, a second arm rigid with the first arm, a lever on the second arm, one arm of said lever being arranged to throw in the clutch, a spring connected to the other arm of said lever and acting to urge said lever to throw in the clutch when the treadle is depressed, and means responsive to growth of the yarn mass on the beam for tensioning said spring.

27. A warper having, in combination, a beam-driving clutch, means to operate the clutch to drive the beam at high speed, a treadle, an arm arranged to be moved by said treadle, a second arm rigid with the first arm, a lever on the second arm, one arm of said lever being arranged to throw in the clutch, and a spring connected with the other arm of said lever and acting to urge said lever to throw in the clutch when the treadle is depressed.

28. A warper having, in combination, a beam-driving clutch, means manually shiftable between two positions and arranged in one position to disengage said clutch while running at high speed and in the other position to operate the clutch from idle position to drive the beam at high speed and a treadle and connections for operating the clutch from idle position to drive the beam at low speed.

29. A warper having, in combination, a driving friction clutch, two independent means to throw the clutch in and out, and means responsive to growth of the yarn mass on the beam for adjusting both of said means.

30. A warper having, in combination, a driving friction clutch, two independent means to throw the clutch in and out, and means responsive to growth of the yarn mass on the beam for adjusting one of said means.

31. A warper having, in combination, a beam-driving friction clutch, a treadle depressible to a variable extent and arranged to exert a corresponding variable pressure on the clutch to obtain a variable low-speed drive for the beam, and means responsive to growth of the yarn mass on the beam for increasing the pressure exerted in a given depression of the treadle.

32. A warper having, in combination a beam-rotating drum, a shaft geared to said drum, a drive pulley rotatably mounted on said shaft intermediate the ends of the latter, and a driving clutch and a braking clutch mounted on opposite ends of said shaft, said driving clutch being arranged to transmit power from the pulley to the shaft.

In testimony whereof, I have hereunto affixed my signature.

BURT A. PETERSON.